United States Patent
Sakurai et al.

(10) Patent No.: US 12,540,229 B2
(45) Date of Patent: Feb. 3, 2026

(54) FLAME-RETARDANT COMPOSITION AND FLAME-RETARDANT SYNTHETIC RESIN COMPOSITION

(71) Applicant: ADEKA CORPORATION, Tokyo (JP)

(72) Inventors: Hisashi Sakurai, Saitama (JP); Yutaka Yonezawa, Saitama (JP); Naoko Tanji, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 1116 days.

(21) Appl. No.: 17/440,642

(22) PCT Filed: Mar. 19, 2020

(86) PCT No.: PCT/JP2020/012521
§ 371 (c)(1),
(2) Date: Jan. 26, 2022

(87) PCT Pub. No.: WO2020/203374
PCT Pub. Date: Oct. 8, 2020

(65) Prior Publication Data
US 2022/0153960 A1    May 19, 2022

(30) Foreign Application Priority Data
Mar. 29, 2019 (JP) .................. 2019-069108

(51) Int. Cl.
C08K 5/00 (2006.01)
C08K 5/3435 (2006.01)
C08K 5/52 (2006.01)
C08L 23/06 (2006.01)

(52) U.S. Cl.
CPC .......... *C08K 5/0066* (2013.01); *C08K 5/3435* (2013.01); *C08K 5/5205* (2013.01); *C08L 23/06* (2013.01); *C08L 2201/02* (2013.01); *C08L 2207/066* (2013.01)

(58) Field of Classification Search
CPC ...... C08K 5/0066; C08K 5/16; C08K 5/3412; C08K 5/3435; C08K 5/06; C08K 5/156; C08K 5/49; C08K 13/00; C08L 2201/02; C08L 2207/066; C08L 23/00; C08L 23/025; C08L 23/04; C08L 23/10
See application file for complete search history.

(56) References Cited

U.S. PATENT DOCUMENTS

| | | |
|---|---|---|
| 3,936,416 A | 2/1976 | Brady |
| 4,010,137 A | 3/1977 | Brady |
| 2003/0088000 A1 | 5/2003 | Kimura et al. |
| 2003/0153653 A1 | 8/2003 | Gugumus |
| 2007/0176154 A1 | 8/2007 | Murase et al. |
| 2008/0111699 A1 | 5/2008 | Kwon et al. |
| 2008/0157038 A1 | 7/2008 | Hong et al. |
| 2009/0312468 A1 | 12/2009 | Tsunoda et al. |
| 2010/0190898 A1 | 7/2010 | Negishi et al. |
| 2013/0023611 A1 | 1/2013 | Negishi et al. |
| 2017/0037220 A1* | 2/2017 | Tani .................. C08K 5/49 |
| 2017/0051208 A1 | 2/2017 | Iwata et al. |
| 2017/0349741 A1 | 12/2017 | Negishi et al. |
| 2018/0105653 A1 | 4/2018 | Ayabe et al. |
| 2019/0062527 A1 | 2/2019 | Mizushima et al. |

FOREIGN PATENT DOCUMENTS

| | | | |
|---|---|---|---|
| CN | 1397590 A | 2/2003 | |
| CN | 1922280 A | 2/2007 | |
| CN | 1926107 A | 3/2007 | |
| CN | 101210096 A | 7/2008 | |
| CN | 101400735 A | 4/2009 | |
| CN | 105980470 A | 9/2016 | |
| CN | 107207827 A | 9/2017 | |
| CN | 107406636 A | 11/2017 | |
| CN | 108699291 A | 10/2018 | |
| EP | 1 077 227 A1 | 2/2001 | |
| JP | 8-176343 A | 7/1996 | |
| JP | 2001-98168 A | 4/2001 | |
| JP | 2003-26935 A | 1/2003 | |
| JP | 2015-221865 A | 12/2015 | |
| JP | 2016-27161 A | 2/2016 | |
| WO | WO 2005/080494 A1 | 9/2005 | |
| WO | WO-2017150662 A1 * | 9/2017 | .............. C08F 10/06 |

OTHER PUBLICATIONS

International Search Report for PCT/JP2020/012521 (PCT/ISA/210) mailed on Jun. 16, 2020.
Written Opinion of the International Searching Authority for PCT/JP2020/012521 (PCT/ISA/237) mailed on Jun. 16, 2020.

* cited by examiner

*Primary Examiner* — Jane L Stanley
(74) *Attorney, Agent, or Firm* — Birch, Stewart, Kolasch & Birch, LLP

(57) ABSTRACT

Provided are: a flame retardant composition which can impart excellent flame retardancy to a synthetic resin even when added in a small amount; and a flame-retardant synthetic resin composition which contains the flame retardant composition and a resin and exhibits excellent flame retardancy. The flame retardant composition contains components (A) and (B), wherein (A) is a phosphate-based flame retardant, and (B) is a hindered amine compound having a structure represented by Chemical Formula (1) in the structure. In Chemical Formula (1), * represents a bond, and one or more of the structures represented by Chemical Formula (1) optionally exist in the compound.

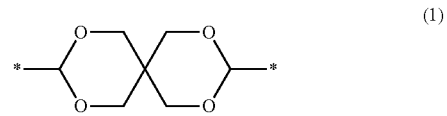

(1)

5 Claims, No Drawings

FLAME-RETARDANT COMPOSITION AND FLAME-RETARDANT SYNTHETIC RESIN COMPOSITION

TECHNICAL FIELD

The present invention relates to: a flame retardant composition which contains a phosphate-based flame retardant and a hindered amine compound having a specific structure; and a flame-retardant synthetic resin composition containing the flame retardant composition (hereinafter, also referred to as "resin composition").

BACKGROUND ART

Conventionally, synthetic resins are, because of their excellent chemical and mechanical properties, widely used in building materials, automobile components, packaging materials, agricultural materials, housing materials of home electric appliances, toys, and the like. However, many of the synthetic resins are flammable; therefore, depending on the application, flame-proofing of such synthetic resins is indispensable. Particularly, since many highly flammable synthetic resins such as polyolefin-based resins are used in a wide range of fields, it is indispensable to incorporate a flame retardant for imparting flame retardancy to these resins.

As a method of flame-proofing a synthetic resin, it is widely known to use one or a combination of halogen-based flame retardants, inorganic phosphorus-based flame retardants typified by red phosphorus and polyphosphoric acid-based flame retardants such as ammonium polyphosphate, organophosphorus-based flame retardants typified by triaryl phosphate compounds, metal hydroxides such as magnesium hydroxide, and flame retardant aids such as antimony oxide and melamine compounds. Halogen-based flame retardants, however, have a problem of generating a toxic gas upon combustion. In addition, metal hydroxides cannot provide flame retardancy unless they are added in a large amount, and thus have a problem of deteriorating the processability of a resin and the physical properties of a molded article. Therefore, attempts have been made to use a phosphorus-based flame retardant as a flame retardant that does not cause these problems.

For example, Patent Document 1 discloses a flame-retardant resin composition which contains ammonium polyphosphate, a polyhydric hydroxy group-containing compound, a triazine ring-containing compound, and a metal hydroxide. Further, Patent Documents 2 and 3 each disclose a flame-retardant synthetic resin composition which contains melamine polyphosphate and (penta- to tripenta-) erythritol.

Thereamong, intumescent-based flame retardants, which exert flame retardancy by forming a surface intumescent layer on combustion and inhibiting diffusion of a decomposition product and heat transfer, have excellent flame retardancy. Technologies relating to such flame retardants are disclosed in, for example, Patent Document 4.

RELATED ART DOCUMENTS

Patent Documents

[Patent Document 1] JPH08-176343A

[Patent Document 2] U.S. Pat. No. 3,936,416A

[Patent Document 3] U.S. Pat. No. 4,010,137A

[Patent Document 4] JP2003-026935A

SUMMARY OF THE INVENTION

Problems to be Solved by the Invention

However, these conventional phosphate-based flame retardants need to be added in a large amount in order to impart sufficient flame retardancy to a synthetic resin, and thus have problems of imposing adverse effects on the physical properties intrinsic to the resin and increasing the blending cost. Accordingly, there is a demand for a flame retardant that exerts excellent flame retardancy in a smaller amount.

In view of the above, an object of the present invention is to provide: a flame retardant composition which can impart excellent flame retardancy to a synthetic resin even when added in a small amount; and a flame-retardant synthetic resin composition which contains the flame retardant composition and a resin and exhibits excellent flame retardancy.

Means for Solving the Problems

The present inventors intensively studied to solve the above-described problems and consequently discovered that the problems can be solved by a flame retardant composition which contains a phosphate-based flame retardant and a hindered amine compound having a specific structure, thereby completing the present invention.

That is, the present invention provides a flame retardant composition characterized by containing components (A) and (B), wherein (A) is a phosphate-based flame retardant, and (B) is a hindered amine compound having a structure represented by Chemical Formula (1) in the structure:

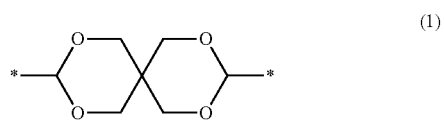

(1)

where * represents a bond, and wherein one or more of the structures represented by Chemical Formula (1) optionally exist in the compound.

In the flame retardant composition of the present invention, the component (B) preferably has a structure represented by Formula (2):

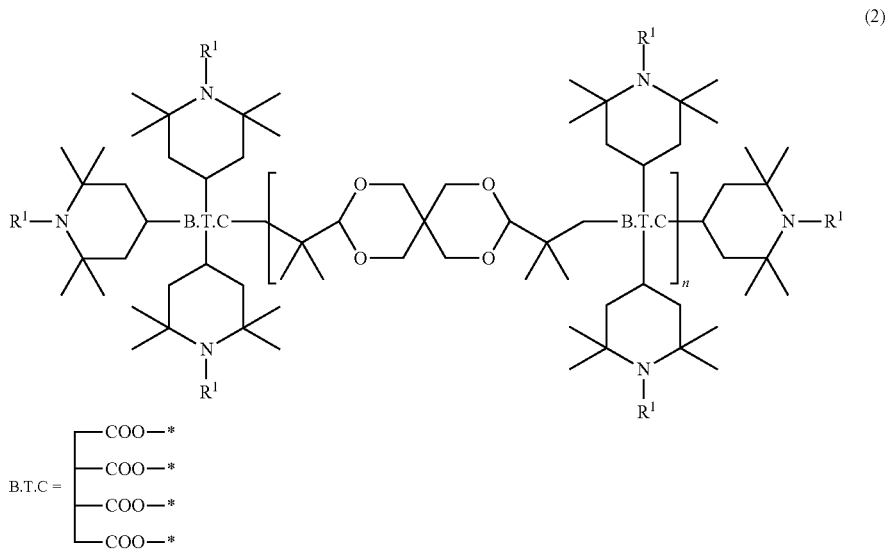

(2)

In Formula (2), * represents a bond; n represents an integer of 1 to 100; and $R^1$ represents a hydrogen atom, a hydroxy group, an alkyl group having 1 to 30 carbon atoms, an alkoxy group having 1 to 30 carbon atoms, a hydroxyalkyl group having 1 to 30 carbon atoms, a hydroxyalkoxy group having 1 to 30 carbon atoms, an alkenyl group having 2 to 30 carbon atoms, or an oxy radical, which alkyl group, alkoxy group, hydroxyalkyl group, hydroxyalkoxy group and alkenyl group are optionally interrupted by one or plural oxygen atoms or carbonyl groups.

In the flame retardant composition of the present invention, the component (A) preferably contains a component (A-1) and/or a component (A-2), wherein
(A-1) is at least one melamine salt selected from the group consisting of melamine orthophosphate, melamine pyrophosphate, and melamine polyphosphate, and
(A-2) is at least one piperazine salt selected from the group consisting of piperazine orthophosphate, piperazine pyrophosphate, and piperazine polyphosphate.

Further, in the flame retardant composition of the present invention, a content ratio of the component (A) and the component (B) is preferably in a range of 99:1 to 80:20 in terms of mass ratio.

The present invention also provides a flame-retardant synthetic resin composition characterized in that it is obtained by incorporating the flame retardant composition into a synthetic resin.

In the flame-retardant synthetic resin composition of the present invention, the synthetic resin is preferably a polyolefin-based resin.

Moreover, the present invention provides a molded article obtained by molding the flame-retardant synthetic resin composition.

Effects of the Invention

According to the present invention, a flame retardant composition which can impart a synthetic resin with superior flame retardancy than before can be provided. In addition, according to the present invention, a flame-retardant synthetic resin composition having excellent flame retardancy can be provided. Further, according to the present invention, a molded article having excellent flame retardancy can be provided.

MODE FOR CARRYING OUT THE INVENTION

Embodiments of the present invention will now be described in detail.

A flame retardant composition of the present invention contains components (A) and (B), wherein
(A) is a phosphate-based flame retardant, and
(B) is a hindered amine compound having a structure represented by Chemical Formula (1) in the structure:

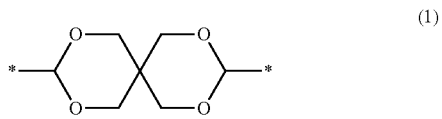

(1)

In Chemical Formula (1), * represents a bond, and one or more of the structures represented by Chemical Formula (1) may exist in the compound.

In the flame retardant composition of the present invention, the phosphate-based flame retardant used as the component (A) contains a phosphoric acid.

The phosphoric acid used in the phosphate-based flame retardant is not particularly restricted, and examples thereof include various phosphoric acids, such as orthophosphoric acid, pyrophosphoric acid, and polyphosphoric acid.

Examples of the phosphate-based flame retardant include phosphates that are salts composed of the above-described various phosphoric acids and at least one metal or compound selected from metals belonging to Groups 1 to 14 of the periodic table, ammonia, aliphatic amines, and aromatic amines.

Examples of the metals belonging to Groups 1 to 14 of the periodic table include lithium, sodium, calcium, barium, iron (II), iron (III), and aluminum.

Examples of the aliphatic amines include methylamine, ethylamine, diethylamine, triethylamine, ethylene diamine, and piperazine.

Examples of the aromatic amines include pyridine, pyrazine, pyridazine, pyrimidine, triazine, melamine, melam, and melem.

The phosphate-based flame retardant may be subjected to a treatment with a silane coupling agent and/or a known water resistance-improving treatment such as coating with a melamine resin, and a known foaming aid such as melamine, melamine cyanurate, or pentaerythritol may be added to the phosphate-based flame retardant.

The phosphate-based flame retardant is specifically, for example, an orthophosphate, a pyrophosphate, or a polyphosphate.

Examples of the orthophosphate include, but not particularly limited to: ammonium salts, such as ammonium phosphate, ammonium dihydrogen phosphate, and diammonium hydrogen phosphate; sodium salts, such as monosodium phosphate, disodium phosphate, trisodium phosphate, monosodium phosphite, disodium phosphite, and sodium hypophosphite; potassium salts, such as monopotassium phosphate, dipotassium phosphate, tripotassium phosphate, monopotassium phosphite, dipotassium phosphite, and potassium hypophosphorous; lithium salts, such as monolithium phosphate, dilithium phosphate, trilithium phosphate, monolithium phosphite, dilithium phosphite, and lithium hypophosphite; barium salts, such as barium dihydrogen phosphate, barium hydrogen phosphate, tribarium phosphate, and barium hypophosphite; magnesium salts, such as magnesium monohydrogen phosphate, magnesium hydrogen phosphate, trimagnesium phosphate, and magnesium hypophosphite; calcium salts, such as calcium dihydrogen phosphate, calcium hydrogen phosphate, tricalcium phosphate, and calcium hypophosphite; zinc salts, such as zinc phosphate, zinc phosphite, and zinc hypophosphite; and amine salts, such as piperazine phosphate and melamine phosphate.

Examples of the pyrophosphate include, but not particularly limited to: ammonium pyrophosphate, piperazine pyrophosphate, melamine pyrophosphate, and aluminum pyrophosphate.

Examples of the polyphosphate include, but not particularly limited to: ammonium polyphosphate, piperazine polyphosphate, melamine polyphosphate, and aluminum polyphosphate.

These phosphate-based flame retardants may be used individually, or two or more thereof may be used as a mixture.

From the standpoints of flame retardancy and heat resistance, the phosphate-based flame retardant of the component (A) preferably contains a component (A-1) and/or a component (A-2), wherein
  (A-1) is at least one melamine salt selected from the group consisting of melamine orthophosphate, melamine pyrophosphate, and melamine polyphosphate, and
  (A-2) is at least one piperazine salt selected from the group consisting of piperazine orthophosphate, piperazine pyrophosphate, and piperazine polyphosphate.

In the component (A) according to the present invention, the melamine salt used as the component (A-1) is selected from the group consisting of melamine orthophosphate, melamine pyrophosphate and melamine polyphosphate, and these melamine salts may be used individually, or in the form of a mixture. Thereamong, melamine pyrophosphate is preferred from the standpoints of flame retardancy, ease of handling and storage stability. When these melamine salts are used in the form of a mixture, the higher the content ratio of melamine pyrophosphate, the more preferred it is. Further, in this melamine pyrophosphate, the ratio of pyrophosphoric acid and melamine is preferably 1:2 in terms of molar ratio.

These salts of phosphoric acids and melamine can each be obtained by a reaction between the corresponding phosphoric acid or a salt thereof with melamine; however, the melamine salt used as the component (A-1) according to the present invention is preferably melamine pyrophosphate or melamine polyphosphate which is obtained by heat condensation of melamine orthophosphate, particularly preferably melamine pyrophosphate.

In the component (A) according to the present invention, the piperazine salt used as the component (A-2) is selected from the group consisting of piperazine orthophosphate, piperazine pyrophosphate and piperazine polyphosphate, and these piperazine salts may be used individually, or in the form of a mixture. Thereamong, piperazine pyrophosphate is preferred from the standpoints of flame retardancy, ease of handling and storage stability. When these piperazine salts are used in the form of a mixture, the higher the content ratio of piperazine pyrophosphate, the more preferred it is. Further, in this piperazine pyrophosphate, the ratio of pyrophosphoric acid and piperazine is preferably 1:1 in terms of molar ratio.

These salts of phosphoric acids and piperazine can each be obtained by a reaction between the corresponding phosphoric acid or a salt thereof with piperazine; however, the piperazine salt used as the component (A-2) according to the present invention is preferably piperazine pyrophosphate or piperazine polyphosphate which is obtained by heat condensation of 1-piperazine 2-orthophosphate, particularly preferably piperazine pyrophosphate.

When the component (A) according to the present invention contains the component (A-1) and the component (A-2), the content ratio of the component (A-1) and the component (A-2) is preferably 20:80 to 50:50 in terms of the mass ratio between the component (A-1) and the component (A-2) and, from the standpoint of flame retardancy, it is more preferably 30:70 to 45:55.

The component (B) according to the present invention is a hindered amine compound having a structure represented by the following Chemical Formula (1) in its structure:

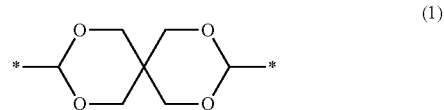 [SMILES: *C1OCC2(CO1)COC(*)OC2]

(1)

In Chemical Formula (1), * represents a bond, and one or more of the structures represented by Chemical Formula (1) may exist in the compound.

From the standpoints of thermal stability, coloration resistance and thermal coloration resistance, the component (B) is preferably, for example, a compound having a structure represented by the following Formula (3):

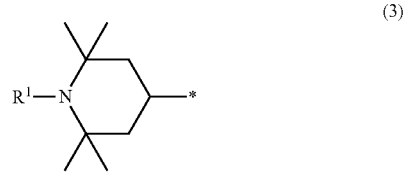

In Formula (3), * represents a bond; and $R^1$ represents a hydrogen atom, a hydroxy group, an alkyl group having 1 to 30 carbon atoms, an alkoxy group having 1 to 30 carbon atoms, a hydroxyalkyl group having 1 to 30 carbon atoms, a hydroxyalkoxy group having 1 to 30 carbon atoms, an alkenyl group having 2 to 30 carbon atoms, or an oxy radical, which alkyl group, alkoxy group, hydroxyalkyl group, hydroxyalkoxy group and alkenyl group are optionally interrupted by one or plural oxygen atoms or carbonyl groups. Further, one or more of the structures represented by Formula (3) may exist in the compound.

The alkyl group having 1 to 30 carbon atoms which may be represented by $R^1$ in Formula (3) is, for example, a linear alkyl group or a branched alkyl group. Examples of the linear alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an icosyl group, a henicosyl group, a docosyl group, a tricosyl group, a tetracosyl group, a pentacosyl group, a hexacosyl group, a heptacosyl group, an octacosyl group, a nonacosyl group and a triacontyl group, and examples of the branched alkyl group include the above-described linear alkyl groups that are substituted with one or more alkyl groups having 1 to 9 carbon atoms.

Examples of the alkoxy group having 1 to 30 carbon atoms, which may be represented by $R^1$ in Formula (3), include alkoxy groups that correspond to the above-exemplified alkyl groups.

Examples of the hydroxyalkyl group having 1 to 30 carbon atoms, which may be represented by $R^1$ in Formula (3), include hydroxyalkyl groups that correspond to the above-exemplified alkyl groups.

Examples of the hydroxyalkoxy group having 1 to 30 carbon atoms, which may be represented by $R^1$ in Formula (3), include hydroxyalkoxy groups that correspond to the above-exemplified alkoxy groups.

Examples of the alkenyl group having 2 to 30 carbon atoms, which may be represented by $R^1$ in Formula (3), include an ethenyl group, a propenyl group, a butenyl group, a pentenyl group, a hexenyl group, a heptenyl group, an octenyl group, a nonenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadecenyl group, an icosenyl group, a heneicosenyl group, a docosenyl group, a tricosenyl group, a tetracosenyl group, a pentacosenyl group, a hexacosenyl group, a heptacosenyl group, an octacosenyl group, a nonacosenyl group, and a triacontenyl group, as well as alkadienyl groups and alkatrienyl groups.

In the structure represented by Formula (3), from the standpoints of thermal stability, coloration resistance and thermal coloration resistance, $R^1$ is preferably an alkyl group having 1 to 30 carbon atoms or a hydrogen atom, more preferably an alkyl group having 1 to 4 carbon atoms or a hydrogen atom, most preferably a methyl group or a hydrogen atom.

Further, from the standpoints of thermal stability, coloration resistance and thermal coloration resistance, the hindered amine compound of the component (B) preferably has a structure represented by the following Formula (2):

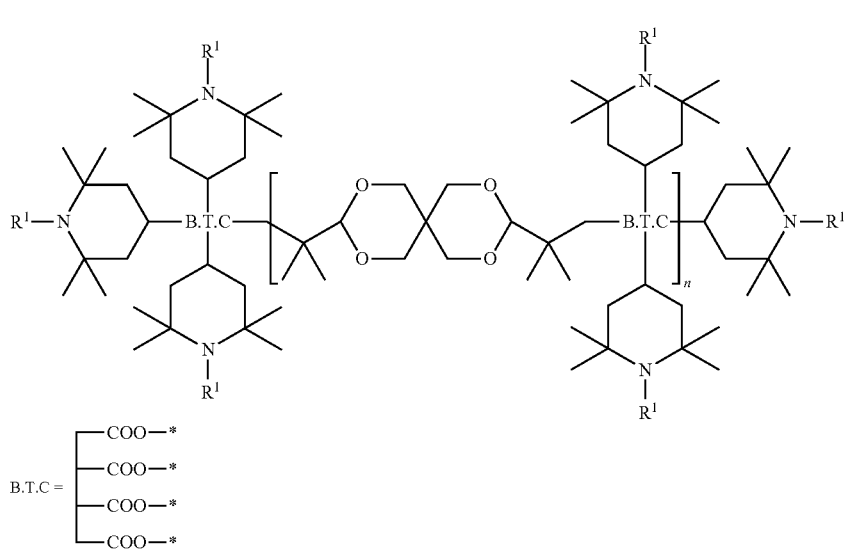

In Formula (2), * represents a bond, and n represents an integer of 1 to 100. Examples of $R^1$ in Formula (2) include the same groups as those exemplified above for $R^1$ in Formula (3).

In the structure represented by Formula (2), from the standpoints of thermal stability, coloration resistance and thermal coloration resistance, $R^1$ is preferably an alkyl group having 1 to 30 carbon atoms or a hydrogen atom, more preferably an alkyl group having 1 to 4 carbon atoms or a hydrogen atom, most preferably a methyl group or a hydrogen atom.

The component (B) according to the present invention may be used individually, or in combination of two or more thereof.

Specific examples of the component (B) according to the present invention include ADK STAB LA-63P (manufactured by ADEKA Corporation) and ADK STAB LA-68 (manufactured by ADEKA Corporation).

As for the content ratio of the component (A) and the component (B) in the flame retardant composition of the present invention, from the standpoint of flame retardancy, the mass ratio between the component (A) and the component (B) is preferably in a range of 99:1 to 80:20, more preferably in a range of 97:3 to 84:16.

In addition, in the flame retardant composition of the present invention, an anti-drip agent may be incorporated as required within a range that does not impair the effects of the present invention. Examples of the anti-drip agent include fluorine-based anti-drip agents, silicone rubbers, and layered silicates.

Examples of the layered silicates include: smectite-type clay minerals, such as montmorillonite, saponite, hectorite, beidellite, stevensite, and nontronite; vermiculite; halloysite; swellable mica; and talc, and those in which organic cations, quaternary ammonium cations or phosphonium cations are intercalated between layers can be used as well.

The anti-drip agent is particularly preferably a fluorine-based anti-drip agent, and specific examples thereof include: fluorocarbon resins, such as polytetrafluoroethylenes, polyvinylidene fluorides, and polyhexafluoropropylenes; and alkali metal perfluoroalkane sulfonates and alkaline earth metal perfluoroalkane sulfonates, such as sodium perfluoromethane sulfonate, potassium perfluoro-n-butane sulfonate, potassium perfluoro-t-butane sulfonate, sodium perfluorooctane sulfonate, and calcium perfluoro-2-ethylhexane sulfonate. Among these anti-drip agents, a polytetrafluoroethylene is most preferred because of its drip-inhibiting property.

When an anti-drip agent is incorporated into the flame retardant composition of the present invention, the content of the anti-drip agent is preferably 0.005 to 5 parts by mass, more preferably 0.01 to 5 parts by mass, still more preferably 0.05 to 3 parts by mass, particularly preferably 0.1 to 1 part by mass, with respect to a total of 100 parts by mass of the components (A) and (B). When the content of the anti-drip agent is less than 0.005 parts by mass, a sufficient drip-inhibiting effect is not obtained, while when the content of the anti-drip agent is higher than 5 parts by mass, the anti-drip agent may cause deterioration of resin properties.

In the flame retardant composition of the present invention, for the purposes of inhibiting secondary aggregation during blending and improving the water resistance, a silicone oil may be incorporated as required within a range that does not impair the effects of the present invention. Examples of the silicone oil include: dimethyl silicone oils in which the side chains and terminals of a polysiloxane are all methyl groups; methylphenyl silicone oils in which some of the side chains of a polysiloxane are phenyl groups; methyl hydrogen silicone oils in which some of the side chains of a polysiloxane are hydrogen atoms; and copolymers of these silicone oils. In addition, modified silicone oils in which organic groups are introduced to some of the side chains and/or terminals of the above-described silicone oils, for example, amine-modified, epoxy-modified, alicyclic epoxy-modified, carboxyl-modified, carbinol-modified, mercapto-modified, polyether-modified, long-chain alkyl-modified, fluoroalkyl-modified, higher fatty acid ester-modified, higher fatty acid amide-modified, silanol-modified, diol-modified, phenol-modified and/or aralkyl-modified silicone oils, may be used as well.

Specific examples of commercially available products of the silicone oil include: dimethyl silicone oils, such as KF-96 (manufactured by Shin-Etsu Chemical Co., Ltd.), KF-965 (manufactured by Shin-Etsu Chemical Co., Ltd.), and KF-968 (manufactured by Shin-Etsu Chemical Co., Ltd.); methyl hydrogen silicone oils or silicone oils having a methyl hydrogen polysiloxane structure, such as KF-99 (manufactured by Shin-Etsu Chemical Co., Ltd.), KF-9901 (manufactured by Shin-Etsu Chemical Co., Ltd.), HMS-151 (manufactured by Gelest Inc.), HMS-071 (manufactured by Gelest Inc.), HMS-301 (manufactured by Gelest Inc.), and DMS-H21 (manufactured by Gelest Inc.); methylphenyl silicone oils, such as KF-50 (manufactured by Shin-Etsu Chemical Co., Ltd.), KF-53 (manufactured by Shin-Etsu Chemical Co., Ltd.), KF-54 (manufactured by Shin-Etsu Chemical Co., Ltd.), and KF-56 (manufactured by Shin-Etsu Chemical Co., Ltd.); epoxy-modified products, such as X-22-343 (manufactured by Shin-Etsu Chemical Co., Ltd.), X-22-2000 (manufactured by Shin-Etsu Chemical Co., Ltd.), KF-101 (manufactured by Shin-Etsu Chemical Co., Ltd.), KF-102 (manufactured by Shin-Etsu Chemical Co., Ltd.), and KF-1001 (manufactured by Shin-Etsu Chemical Co., Ltd.); carboxyl-modified products, such as X-22-3701E (manufactured by Shin-Etsu Chemical Co., Ltd.); carbinol-modified products, such as X-22-4039 (manufactured by Shin-Etsu Chemical Co., Ltd.) and X-22-4015 (manufactured by Shin-Etsu Chemical Co., Ltd.); and amine-modified products, such as KF-393 (manufactured by Shin-Etsu Chemical Co., Ltd.).

In the flame retardant composition of the present invention, as required, a polyhydric alcohol compound may also be incorporated as a flame retardant aid within a range that does not impair the effects of the present invention. The polyhydric alcohol compound is a compound in which plural hydroxyl groups are bound, and examples thereof include pentaerythritol, dipentaerythritol, tripentaerythritol, polypentaerythritol, neopentyl glycol, trimethylolpropane, ditrimethylolpropane, 1,3,5-tris(2-hydroxyethyl)isocyanurate (THEIC), polyethylene glycol, glycerin, diglycerin, mannitol, maltitol, lactitol, sorbitol, erythritol, xylitol, xylose, sucrose, trehalose, inositol, fructose, maltose, and lactose. Among these polyhydric alcohol compounds, at least one selected from the group consisting of pentaerythritol and pentaerythritol condensates, such as pentaerythritol, dipentaerythritol, tripentaerythritol and polypentaerythritol, is preferred, dipentaerythritol or a pentaerythritol condensate is more preferred, and dipentaerythritol is particularly preferred. Further, THEIC and sorbitol can be suitably used as well.

When a polyhydric alcohol compound is incorporated into the flame retardant composition of the present invention, the content thereof is preferably 0.5 to 15 parts by mass, more preferably 2 to 12 parts by mass, still more preferably 5 to 10 parts by mass, with respect to a total of 100 parts by mass of the components (A) and (B).

In the flame retardant composition of the present invention, a lubricant may also be incorporated as required within a range that does not impair the effects of the present invention. Examples of the lubricant include: pure hydrocarbon-based lubricants, such as liquid paraffins, natural paraffins, microwaxes, synthetic paraffins, low-molecular-weight polyethylenes, and polyethylene waxes; halogenated hydrocarbon-based lubricants; fatty acid-based lubricants, such as higher fatty acids and oxy fatty acids; fatty acid amide-based lubricants, such as fatty acid amides and bis-fatty acid amides; ester-based lubricants, such as lower alcohol esters of fatty acids, polyhydric alcohol esters of fatty acids (e.g., glyceride), polyglycol esters of fatty acids, and fatty alcohol esters of fatty acids (ester waxes); metallic soaps; fatty alcohols; polyhydric alcohols; polyglycols; polyglycerols; partial esters composed of fatty acids and polyhydric alcohols; partial ester-based lubricants composed of a fatty acid, a polyglycol, and a polyglycerol; silicone oils; and mineral oils. Two or more of these lubricants may be used in combination.

When a lubricant is incorporated into the flame retardant composition of the present invention, the content thereof is preferably 0.05 to 10 parts by mass, more preferably 0.1 to 5 parts by mass, with respect to a total of 100 parts by mass of the components (A) and (B).

In the flame retardant composition of the present invention, one or more halogen-free organic or inorganic flame retardants or flame retardant aids may be further used as required within a range that does not impair the effects of the present invention. Examples of such flame retardants and flame retardant aids include triazine ring-containing compounds, metal hydroxides, phosphate-based flame retardants, condensed phosphate-based flame retardants, inorganic phosphorus-based flame retardants, dialkyl phosphinates, silicone-based flame retardants, metal oxides, boric acid compounds, expandable graphites, other inorganic flame retardant aids, and other organic flame retardants.

Examples of the triazine ring-containing compounds include melamine, ammeline, benzoguanamine, acetoguanamine, phthalodiguanamine, melamine cyanurate, butylene diguanamine, norbornene diguanamine, methylene diguanamine, ethylene dimelamine, trimethylene dimelamine, tetramethylene dimelamine, hexamethylene dimelamine, and 1,3-hexylene dimelamine.

Examples of the metal hydroxides include magnesium hydroxide, aluminum hydroxide, calcium hydroxide, barium hydroxide, zinc hydroxide, and KISUMA 5A (trademark of magnesium hydroxide manufactured by Kyowa Chemical Industry Co., Ltd.).

Examples of the phosphate-based flame retardants include trimethyl phosphate, triethyl phosphate, tributyl phosphate, tributoxyethyl phosphate, trischloroethyl phosphate, trisdichloropropyl phosphate, triphenyl phosphate, tricresyl phosphate, cresyldiphenyl phosphate, trixylenyl phosphate, octyldiphenyl phosphate, xylenyldiphenyl phosphate, tris (isopropylphenyl)phosphate, 2-ethylhexyldiphenyl phosphate, t-butylphenyldiphenyl phosphate, bis(t-butylphenyl) phenyl phosphate, tris(t-butylphenyl)phosphate, isopropylphenyldiphenyl phosphate, bis(isopropylphenyl) diphenyl phosphate, and tris(isopropylphenyl)phosphate.

Examples of the condensed phosphate-based flame retardants include 1,3-phenylene-bis(diphenyl phosphate), 1,3-phenylene-bis(dixylenyl phosphate), and bisphenol A-bis (diphenyl phosphate).

Examples of the inorganic phosphorus-based flame retardants include red phosphorus.

Examples of the dialkyl phosphinates include aluminum diethylphosphinate and zinc diethylphosphinate.

Examples of the above-described other inorganic flame retardant aids include inorganic compounds, such as titanium oxide, aluminum oxide, magnesium oxide, and hydrotalcite; and surface-treated products thereof. Specifically, for example, a variety of commercially available products, such as TIPAQUE R-680 (trademark of titanium oxide manufactured by Ishihara Sangyo Kaisha, Ltd.), KYOWAMAG 150 (trademark of magnesium oxide manufactured by Kyowa Chemical Industry Co., Ltd.), DHT-4A (hydrotalcite, manufactured by Kyowa Chemical Industry Co., Ltd.) and ALCAMIZER 4 (trademark of zinc-modified hydrotalcite manufactured by Kyowa Chemical Industry Co., Ltd.), can be used.

In the flame retardant composition of the present invention, as required, a phenolic antioxidant, a phosphorus-based antioxidant, a thioether-based antioxidant, an ultraviolet absorber, a hindered amine compound other than the component (B), an age inhibitor and the like may be incorporated as well. These components may be incorporated into the flame retardant composition of the present invention in advance, or may be incorporated into a synthetic resin at the time of blending the flame retardant composition with the synthetic resin. It is preferred to stabilize the synthetic resin by incorporating these components.

Examples of the phenolic antioxidant include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylene-bis[(3,5-di-tert-butyl-4-hydroxyphenyl) propionic acid amide], 4,4'-thiobis(6-tert-butyl-m-cresol), 2,2'-methylene-bis(4-methyl-6-tert-butylphenol), 2,2'-methylene-bis(4-ethyl-6-tert-butylphenol), 4,4'-butylidene-bis(6-tert-butyl-m-cresol), 2,2'-ethylidene-bis(4,6-di-tert-butylphenol), 2,2'-ethylidene-bis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3,5-di-tert-butyl-4-hydroxyphenyl)propionate, tetrakis[methylene-3-(3,5-di-tert-butyl-4-hydroxyphenyl)propionate]methane, thiodiethylene glycol-bis[(3,5-di-tert-butyl-4-hydroxyphenyl)propionate], 1,6-hexamethylene-bis[(3,5-di-tert-butyl-4-hydroxyphenyl)propionate], bis[3,3-bis(4-hydroxy-3-tert-butylphenyl)butyric acid]glycol ester, bis[2-tert-butyl-4-methyl-6-(2-hydroxy-3-tert-butyl-5-methylbenzyl)phenyl] terephthalate, 1,3,5-tris[(3,5-di-tert-butyl-4-hydroxyphenyl) propionyloxyethyl]isocyanurate, 3,9-bis[1,1-dimethyl-2-{(3-tert-butyl-4-hydroxy-5-methylphenyl)propionyloxy} ethyl]-2,4,8,10-tetraoxaspiro[5.5]undecane, and triethylene glycol-bis[(3-tert-butyl-4-hydroxy-5-methylphenyl)propionate].

When incorporated into a synthetic resin, these phenolic antioxidants are used in an amount of preferably 0.001 to 5% by mass, more preferably 0.05 to 3% by mass, in the resulting resin composition.

Examples of the phosphorus-based antioxidant include trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tertbutylphenyl)biphenylene diphosphonite, 9,10-dihydro-9-oxa-10-phosphaphenanthrene-10-oxide, 2,2'-methylene-bis(4,6-tert-butylphenyl)-2-ethylhexyl phosphite, 2,2'-methylene-bis(4,6-tert-butylphenyl)-octadecyl phosphite, 2,2'-ethylidene-bis(4,6-di-tert-butylphenyl)fluorophosphite, tris(2-[(2,4,8,10-tetrakis-tert-butyldibenzo[d,f][1,3,2]dioxaphosphepin-6-yl)oxy]ethyl)amine, and phosphite of 2-ethyl-2-butylpropylene glycol and 2,4,6-tri-tert-butylphenol.

When incorporated into a synthetic resin, these phosphorus-based antioxidants are used in an amount of preferably 0.001 to 5% by mass, more preferably 0.05 to 3% by mass, in the resulting resin composition.

Examples of the thioether-based antioxidant include: dialkyl thiodipropionates, such as dilauryl thiodipropionate, dimyristyl thiodipropionate, and distearyl thiodipropionate; and pentaerythritol tetrakis(β-alkylmercaptopropionate)s.

When incorporated into a synthetic resin, these thioether-based antioxidants are used in an amount of preferably 0.001 to 5% by mass, more preferably 0.05 to 3% by mass, in the resulting resin composition.

Examples of the ultraviolet absorber include: 2-hydroxybenzophenones, such as 2,4-dihydroxybenzophenone, 2-hydroxy-4-methoxybenzophenone, 2-hydroxy-4-octoxybenzophenone, and 5,5'-methylene-bis(2-hydroxy-4-methoxybenzophenone); 2-(2'-hydroxyphenyl)benzotriazoles, such as 2-(2'-hydroxy-5'-methylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylene-bis(4-tert-octyl-6-(benzotriazolyl)phenol), and 2-(2'-hydroxy-3'-tert-butyl-5'-carboxyphenyl)benzotriazole; benzoates, such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate, and hexadecyl-3,5-di-tert-butyl-4-hydroxybenzoate; substituted oxanilides, such as 2-ethyl-2'-ethoxyoxanilide and 2-ethoxy-4'-dodecyloxanilide; cyanoacrylates, such as ethyl-α-cyano-β,β-diphenylacrylate and methyl-2-cyano-3-methyl-3-(p-methoxyphenyl)acrylate; and triaryltriazines, such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-tert-butylphenyl)-s-triazine.

When incorporated into a synthetic resin, these ultraviolet absorbers are used in an amount of preferably 0.001 to 5% by mass, more preferably 0.05 to 3% by mass, in the resulting resin composition.

Examples of the above-described other hindered amine compound include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)-bis(tridecyl)-1,2,3,4-butanetetracarboxylate, bis(1,2,2,6,6-pentamethyl-4-piperidyl)-bis(tridecyl)-1,2,3,4-butanetetracarboxylate, bis(1,2,2,6,6-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate poly condensates, 1,6-bis(2,2,6,6-tetramethyl-4-piperidylamino)hexane/2,4-dichloro-6-morpholino-s-triazine poly condensates, 1,6-bis(2,2,6,6-tetramethyl-4-piperidylamino)hexane/2,4-dichloro-6-tert-octylamino-s-triazine poly condensates, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylamino]undecane, and 1,6,11-tris[2,4-bis(N-butyl-N-(1,2,2,6,6-pentamethyl-4-piperidyl)amino)-s-triazine-6-ylamino]undecane.

When incorporated into a synthetic resin, these other hindered amine compounds are used in an amount of preferably 0.001 to 5% by mass, more preferably 0.05 to 3% by mass, in the resulting resin composition.

Examples of the age inhibitor include naphthylamine-based age inhibitors, diphenylamine-based age inhibitors, p-phenyldiamine-based age inhibitors, quinoline-based age inhibitors, hydroquinone derivatives, monophenol-based age inhibitors, thiobisphenol-based age inhibitors, hindered phenol-based age inhibitors, and phosphite-based age inhibitors.

When incorporated into a synthetic resin, these age inhibitors are used in an amount of preferably 0.001 to 5% by mass, more preferably 0.05 to 3% by mass, in the resulting resin composition.

In the flame retardant composition of the present invention, a reinforcing material may also be incorporated as an optional component within a range that does not impair the effects of the present invention. This component may be incorporated into a synthetic resin at the time of blending the flame retardant composition of the present invention with the synthetic resin. As the reinforcing material, a fiber-form, plate-form, particle-form or powder-form reinforcing material that is usually used for reinforcement of a synthetic resin can be used. Specific examples thereof include: inorganic fibrous reinforcing materials, such as glass fibers, asbestos fibers, carbon fibers, graphite fibers, metal fibers, potassium titanate whiskers, aluminum borate whiskers, magnesium-based whiskers, silicon-based whiskers, wollastonite, sepiolite, asbestos, slag fibers, zonolite, ellestadite, gypsum fibers, silica fibers, silica-alumina fibers, zirconia fibers, boron nitride fibers, silicon nitride fibers, and boron fibers; organic fibrous reinforcing materials, such as polyester fibers, nylon fibers, acrylic fibers, regenerated cellulose fibers, acetate fibers, kenaf, ramie, cotton, jute, hemp, sisal, flax, linen, silk, Manila hemp, sugarcane, wood pulp, wastepaper, recycled wastepaper, and wool; and plate-form and particle-form reinforcing materials, such as glass flakes, non-swelling mica, graphites, metal foils, ceramic beads, clay, mica, sericite, zeolite, bentonite, dolomite, kaolin, fine powder silicic acid, feldspar powder, potassium titanate, shirasu balloon, calcium carbonate, magnesium carbonate, barium sulfate, calcium oxide, aluminum oxide, titanium oxide, aluminum silicate, silicon oxide, gypsum, novaculite, dawsonite, and white clay. These reinforcing materials may be coated or bundled with a thermoplastic resin such as an ethylene-vinyl acetate copolymer or a thermosetting resin such as an epoxy resin, or may be treated with a coupling agent such as aminosilane or epoxysilane.

In the flame retardant composition of the present invention, a nucleating agent may be further incorporated as an optional component within a range that does not impair the effects of the present invention. As the nucleating agent, one which is generally used as a nucleating agent of a polymer can be used as appropriate and, in the present invention, any of inorganic nucleating agents and organic nucleating agents can be used. These components may be incorporated into a synthetic resin at the time of blending the flame retardant composition of the present invention with the synthetic resin.

Specific examples of the inorganic nucleating agents include kaolinite, synthetic mica, clay, zeolite, silica, graphite, carbon black, magnesium oxide, titanium oxide, calcium sulfide, boron nitride, calcium carbonate, barium sulfate, aluminum oxide, neodymium oxide, and metal salts of phenylphosphonate. These inorganic nucleating agents may be modified with an organic substance so as to improve their dispersion in the composition.

Specific examples of the organic nucleating agents include: organic metal carboxylates, such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, potassium dibenzoate, lithium dibenzoate, sodium β-naphthalate, sodium cyclohexane carboxylate, 4-tert-butylbenzoate aluminum salt; organic sulfonates, such as sodium p-toluene sulfonate and sodium sulfoisophthalate; carboxylic acid amides, such as stearic acid amide, ethylene-bis-lauric acid amide, palmitic acid amide, hydroxystearic acid amide, erucic acid amide, and trimesic acid tris(tert-butylamide); benzylidene sorbitol and derivatives thereof; phosphorus compound metal salts, such as sodium-2,2'-methylene-bis(4,6-di-tert-butylphenyl)phosphate; and 2,2-methylbis(4,6-di-tert-butylphenyl)sodium.

Further, in the flame retardant composition of the present invention, an acrylic processing aid may be incorporated as an optional component within a range that does not impair the effects of the present invention. As the acrylic processing aid, one obtained by polymerizing a single kind of (meth) acrylic acid ester or copolymerizing two or more kinds of (meth)acrylic acid esters can be used. This component may be incorporated into a synthetic resin at the time of blending the flame retardant composition of the present invention with the synthetic resin. Examples of the (meth)acrylic acid ester(s) to be polymerized/copolymerized include (meth) acrylates, such as methyl acrylate, methyl methacrylate, ethyl acrylate, ethyl methacrylate, n-propyl acrylate, isopropyl acrylate, n-propyl methacrylate, isopropyl methacrylate, n-butyl acrylate, isobutyl acrylate, t-butyl methacrylate, n-hexyl acrylate, n-hexyl methacrylate, 2-ethylhexyl acrylate, 2-ethylhexyl methacrylate, dodecyl methacrylate, and tridecyl methacrylate. Other examples include (meth)acrylic acid and hydroxy group-containing (meth)acrylates.

In the flame retardant composition of the present invention, a plasticizer may also be incorporated as an optional component within a range that does not impair the effects of the present invention. As the plasticizer, one which is generally used as a plasticizer of a polymer can be used as appropriate, and examples thereof include polyester-based plasticizers, glycerol-based plasticizers, polycarboxylic acid ester-based plasticizers, polyalkylene glycol-based plasticizers, and epoxy-based plasticizers.

This component may be incorporated into a synthetic resin at the time of blending the flame retardant composition of the present invention with the synthetic resin.

In addition to the above, in the flame retardant composition of the present invention, an additive(s) normally used in a synthetic resin, such as a cross-linking agent, an antistatic agent, a metallic soap, a filler, an anti-fogging agent, a plate-out inhibitor, a surface treatment agent, a fluorescent agent, an antifungal agent, a disinfectant, a foaming agent, a metal deactivator, a mold release agent, a pigment, a neutralizer, and/or a processing aid other than the above-described acrylic processing aid, can be incorporated as required within a range that does not impair the effects of the present invention.

These components may be incorporated into a synthetic resin at the time of blending the flame retardant composition of the present invention with the synthetic resin.

The flame retardant composition of the present invention can be obtained by mixing the components (A) and (B) with, as required, other optional components, and a variety of mixing machines can be employed for the mixing. These components may be heated during the mixing. Examples of the mixing machines that can be employed include tumbler mixers, Henschel mixers, ribbon blenders, V-type mixers, W-type mixers, super mixers, and Nauta mixers.

The flame retardant composition of the present invention is effective in flame-proofing of synthetic resins and preferably blended with a synthetic resin to be used as a flame-retardant synthetic resin composition.

Specific examples of a synthetic resin to be flame-proofed by the flame retardant composition of the present invention include: α-olefin polymers, such as polypropylenes, high-density polyethylenes, low-density polyethylenes, linear low-density polyethylenes, cross-linked polyethylenes, ultrahigh-molecular-weight polyethylenes, polybutene-1, and poly-3-methylpentene; polyolefins and copolymers thereof, such as ethylene-vinyl acetate copolymers, ethylene-ethyl acrylate copolymers, and ethylene-propylene copolymers; halogen-containing resins, such as polyvinyl chlorides, polyvinylidene chlorides, chlorinated polyethylenes, chlorinated polypropylenes, polyvinylidene fluorides, chlorinated rubbers, vinyl chloride-vinyl acetate copolymers, vinyl chloride-ethylene copolymers, vinyl chloride-vinylidene chloride copolymers, vinyl chloride-vinylidene chloride-vinyl acetate ternary copolymers, vinyl chloride-acrylate copolymers, vinyl chloride-maleate copolymers, and vinyl chloride-cyclohexylmaleimide copolymers; petroleum resins; coumarone resins; polystyrenes; polyvinyl acetates; acrylic resins; polymethyl methacrylates; polyvinyl alcohols; polyvinyl formals; polyvinyl butyrals; aromatic polyesters, such as polyalkylene terephthalates (e.g., polyethylene terephthalate, polybutylene terephthalate, and polycyclohexane dimethylene terephthalate) and polyalkylene naphthalates (e.g., polyethylene naphthalate and polybutylene naphthalate); linear polyesters, such as polytetramethylene terephthalate; degradable aliphatic polyesters, such as polyhydroxybutyrate, polycaprolactone, polybutylene succinate, polyethylene succinate, polylactic acid resins, polymalic acid, polyglycolic acid, polydioxane, and poly(2-oxetanone); thermoplastic resins and blends thereof, such as polyphenylene oxide, polyamides (e.g., polycaprolactam, and polyhexamethylene adipamide), polycarbonates, branched polycarbonates, polyacetals, polyphenylene sulfides, polyurethanes, and cellulose-based resins; thermosetting resins, such as phenol resins, urea resins, melamine resins, epoxy resins, and unsaturated polyester resins; fluorocarbon resins; silicone resins; polyether sulfones; polysulfones; polyphenylene ethers; polyether ketones; polyether ether ketones; and liquid crystal polymers. Other examples include isoprene rubbers, butadiene rubbers, acrylonitrile-butadiene copolymer rubbers, styrene-butadiene copolymer rubbers, fluorine rubbers, and silicone rubbers.

Specific examples of a synthetic resin to be flame-proofed further include olefin-based thermoplastic elastomers, styrene-based thermoplastic elastomers, polyester-based thermoplastic elastomers, nitrile-based thermoplastic elastomers, nylon-based thermoplastic elastomers, vinyl chloride-based thermoplastic elastomers, polyamide-based thermoplastic elastomers, and polyurethane-based thermoplastic elastomers.

These synthetic resins may be used individually, or two or more thereof may be used in combination. These synthetic resins may be alloyed as well.

In the present invention, the above-described synthetic resins can be used regardless of, for example, the molecular weight, the polymerization degree, the density, the softening point, the insoluble component-to-solvent ratio, the degree of stereoregularity, the presence or absence of a catalyst residue, the type and blend ratio of each monomer used as a raw material, and the type of a polymerization catalyst (e.g., a Ziegler catalyst or a metallocene catalyst).

Among above-described synthetic resins, polyolefin-based resins are preferred since excellent flame retardancy can be imparted thereto.

Examples of the polyolefin-based resins include: α-olefin polymers, such as polyethylenes, low-density polyethylenes, linear low-density polyethylenes, high-density polyethylenes, polypropylenes, homopolypropylenes, random copolymer polypropylenes, block copolymer polypropylenes, impact copolymer polypropylenes, high-impact copolymer polypropylenes, isotactic polypropylenes, syndiotactic polypropylenes, hemi-isotactic polypropylenes, maleic anhydride-modified polypropylenes, polybutenes, cycloolefin polymers, stereo block polypropylenes, poly-3-methyl-1-butenes, poly-3-methyl-1-pentenes, and poly-4-methyl-1-pentenes; and α-olefin copolymers, such as ethylene-propylene block or random copolymers, ethylene-methyl methacrylate copolymers, and ethylene-vinyl acetate copolymers.

In the flame-retardant synthetic resin composition of the present invention, from the standpoint of flame retardancy, the total content of the components (A) and (B) is preferably 10% by mass to less than 60% by mass, more preferably 20% by mass to less than 50% by mass, still more preferably 25% by mass to less than 45% by mass. When the total content is less than 10% by mass, sufficient flame retardancy may not be exerted, while when the total content is 60% by mass or higher, the physical properties intrinsic to the resin may be deteriorated.

A molded article having excellent flame retardancy can be obtained by molding the flame-retardant resin composition of the present invention. A molding method is not particularly restricted, and examples thereof include extrusion processing, calender processing, injection molding, rolling, compression molding, and blow molding. Molded articles of various shapes, such as resin plates, sheets, films, fibers and special shape articles, can be produced by these methods.

The flame-retardant resin composition of the present invention can be used for housings (e.g., frames, casings, covers, and exterior materials) and components of electric vehicles, machines, electric/electronic appliances, office-automation equipment and the like as well as automobile interior and exterior materials, and can be suitably used in applications where the UL-94VTM standard needs to be satisfied.

The flame-retardant synthetic resin composition of the present invention and a molded article thereof can be used in a wide range of industrial fields, including the fields of electricity/electronics/communication, agriculture/forestry/fisheries, mining, construction, food, textiles, clothing, health care, coal, petroleum, rubber, leather, automobiles, precision instruments, wood materials, building materials, civil engineering, furniture, printing, and musical instruments. More specifically, the flame-retardant synthetic resin composition of the present invention and a molded article thereof can be applied to, for example, office supplies and office-automation equipment, such as printers, personal computers, word processors, keyboards, PDA (Personal Digital Assistant) devices, telephones, copy machines, facsimile machines, ECRs (electronic cash registers), electronic calculators, electronic organizers, cards, holders, and stationery; home electric appliances, such as laundry machines, refrigerators, vacuum cleaners, microwave ovens, lighting fixtures, gaming machines, irons, and foot warmers; audio-visual equipment, such as TVs, video tape recorders, video cameras, radio-cassette recorders, tape recorders, mini discs, CD players, speakers, and liquid crystal displays; electric and electronic components, such as connectors, relays, capacitors, switches, printed circuit boards, coil bobbins, semiconductor sealing materials, LED sealing materials, electric wires, cables, transformers, deflection yokes, distribution boards, and clocks; housings (e.g., frames, casings, covers, and exterior materials) and components of communication equipment, office-automation equipment and the like; and automobile interior and exterior materials.

The flame-retardant synthetic resin composition of the present invention and a molded article thereof can also be used in other various applications, for example, materials of automobiles, hybrid cars, electric cars, vehicles, ships, airplanes, buildings and houses, as well as construction and civil engineering materials, such as seats (e.g., stuffing and cover materials), belts, ceiling covers, convertible tops, armrests, door trims, rear package trays, carpets, mats, sun visors, wheel covers, mattress covers, air-bags, insulating materials, straps, strap belts, wire coating materials, electric insulating materials, paints, coating materials, veneer materials, floor materials, baffle walls, carpets, wallpapers, wall decorating materials, exterior materials, interior materials, roof materials, deck materials, wall materials, pillar materials, floor boards, fence materials, framework and molding materials, window and door-shaping materials, shingle boards, sidings, terraces, balconies, soundproof boards, heat insulating boards, and window materials; and household articles and sporting goods, such as clothing materials, curtains, bed linens, plywood boards, synthetic fiber boards, rugs, doormats, leisure sheets, buckets, hoses, containers, eye glasses, bags, casings, goggles, skis, rackets, tents, and musical instruments.

EXAMPLES

The present invention will now be described in detail by way of Examples thereof. The present invention is, however, not restricted to the following Examples by any means. It is noted here that the amounts shown in Tables below are all based on parts by mass.

Examples 1 to 6 and Comparative Examples 1 to 9

Resin compositions containing the flame retardant composition of the present invention (Examples 1 to 6) and resin compositions for comparison (Comparative Examples 1 to 9) were produced by blending various components in accordance with the respective formulations shown in Tables 1 and 2.

As a phosphate-based flame retardant of component (A), a mixture obtained by producing components (A-1) and (A-2), which are the constituents of the component (A), by the below-described respective methods and mixing these components (A-1) and (A-2) at a mass ratio of 30:70, 35:65, 40:60, or 45:55 was used.

Production Example 1

Component (A-1): Melamine Salt

A melamine salt containing melamine pyrophosphate as a main component was produced by a heat condensation reaction of melamine orthophosphate in a solid-phase state at 220° C. for 6 hours. The thus obtained melamine salt was used as is without purification. The purity of melamine pyrophosphate in the melamine salt was 98.5%.

The purity was analyzed using an ion chromatograph manufactured by Thermo Fisher Scientific, Inc. (ICS-2100), a column manufactured by Thermo Fisher Scientific, Inc. (Dionex Ion Pac AS-19), an electrical conductivity detector, and an aqueous potassium hydroxide solution (eluent).

Production Example 2

Component (A-2): Piperazine Salt

A piperazine salt containing piperazine pyrophosphate as a main component was produced by a heat condensation reaction of piperazine orthophosphate in a solid-phase state at 250° C. for 1 hour. The thus obtained piperazine salt was used as is without purification. The purity of piperazine pyrophosphate in the piperazine salt was 99.0%.

The purity was analyzed using an ion chromatograph manufactured by Thermo Fisher Scientific, Inc. (ICS-2100), a column manufactured by Thermo Fisher Scientific, Inc. (Dionex Ion Pac AS-19), an electrical conductivity detector, and an aqueous potassium hydroxide solution (eluent).

As a hindered amine compound of component (B), the following hindered amine compound 1 or 2 having a structure represented by Chemical Formula (1) was used.
- Hindered amine compound 1: ADK STAB LA-63P (manufactured by ADEKA Corporation, a compound represented by Formula (2) wherein $R^1$ is $CH_3$)
- Hindered amine compound 2: ADK STAB LA-68 (manufactured by ADEKA Corporation, a compound represented by Formula (2) wherein $R^1$ is H)

In Comparative Examples, the following hindered amine compounds 3 to 5 not having a structure represented by Chemical Formula (1) were used for comparison with each hindered amine compound of the component (B) that was used in Examples.

Hindered Amine Compound 3:

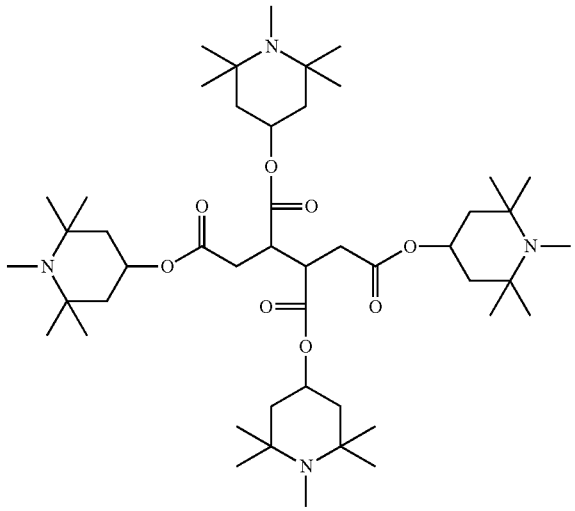

Hindered Amine Compound 4:

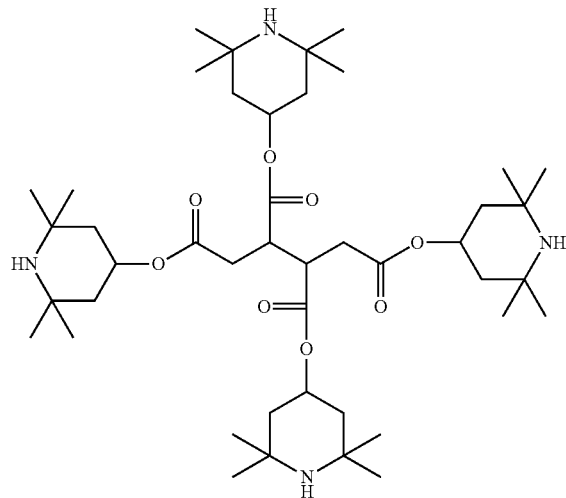 [SMILES: CC1(C)CC(OC(=O)CC(C(=O)OC2CC(C)(C)NC(C)(C)C2)C(CC(=O)OC2CC(C)(C)NC(C)(C)C2)C(=O)OC2CC(C)(C)NC(C)(C)C2)CC(C)(C)N1]

Hindered Amine Compound 5:

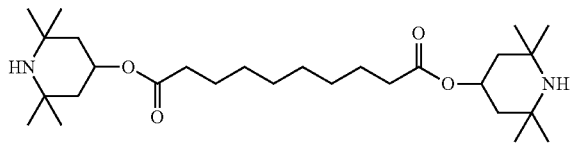 [SMILES: CC1(C)CC(OC(=O)CCCCCCCCC(=O)OC2CC(C)(C)NC(C)(C)C2)CC(C)(C)N1]

Components were blended as shown in Tables 1 and 2, and the resulting flame-retardant synthetic resin compositions were each extruded at 200° C. to produce a pellet. The thus obtained pellet was press-molded at 200° C. to obtain a 0.37 to 0.47 mm-thick film sample for flame retardancy test. Using this film sample, a UL-94VTM test was conducted by the below-described test method. The results thereof are shown in Tables 1 and 2.

<UL-94VTM Flame Retardancy Test Method>

Each film sample was evaluated in accordance with the UL-94VTM method. The sample was cut into a size of 20 cm×5 cm and left to stand for 48 hours in an environment of 23±2° C. and 50±5% RH. Subsequently, the sample was rolled in a cylindrical shape such that the lower end did not overlap, and the sample was vertically held with the lower end being positioned 10 mm above a burner. The lower end of this sample was brought into contact with a flame for 3 seconds using a Bunsen burner having an inner diameter of 9.5 mm and a flame length of 20 mm as a heating source, and the burning time (seconds) was measured. After the burning stopped, the sample was again brought into contact with a flame for 3 seconds, and the burning time (seconds) was measured. The flame retardancy was evaluated in accordance with the evaluation criteria of VTM-0, VTM-1 and VTM-2 and, in the measurements (n=5), the rating of a test piece that corresponded to the lowest standard was defined as the evaluation rating of the resin composition. An evaluation of "NR" (No Rating) was given when the rating did not correspond to any of VTM-0 to VTM-2. In addition, at the same time, it was evaluated whether or not cotton placed under the test piece was ignited by cinders falling from the test piece, and the number of times when the cotton was ignited was recorded.

TABLE 1

| | | Example 1 | Example 2 | Example 3 | Example 4 | Example 5 | Example 6 | Comparative Example 1 | Comparative Example 2 |
|---|---|---|---|---|---|---|---|---|---|
| Amount | Low-density polyethylene[*1] | 71 | 71 | 67 | 71 | 71 | 71 | 72 | 71 |
| | Phenolic antioxidant[*2] | 0.1 | 0.1 | 0.1 | 0.1 | 0.1 | 0.1 | 0.1 | 0.1 |
| | Phosphorus-based antioxidant[*3] | 0.1 | 0.1 | 0.1 | 0.1 | 0.1 | 0.1 | 0.1 | 0.1 |
| | Neutralizer[*4] | 0.1 | 0.1 | 0.1 | 0.1 | 0.1 | 0.1 | 0.1 | 0.1 |
| | Lubricant[*5] | 0.3 | 0.3 | 0.3 | 0.3 | 0.3 | 0.3 | 0.3 | 0.3 |
| | Component (A): phosphate-based flame retardant 1 (A-1):(A-2) = 30:70 | | | | 28 | | | | |
| | Component (A): phosphate-based flame retardant 2 (A-1):(A-2) = 35:65 | | | | | 28 | | | |
| | Component (A): phosphate-based flame retardant 3 (A-1):(A-2) = 40:60 | 28 | 28 | 28 | | | | 28 | 29 |
| | Component (A): phosphate-based flame retardant 4 (A-1):(A-2) = 45:55 | | | | | | 28 | | |
| | Component (B): hindered amine compound 1 | 1 | | 5 | 1 | 1 | 1 | | |
| | Component (B): hindered amine compound 2 | | 1 | | | | | | |
| | Comparative component: hindered amine compound 3 | | | | | | | | |
| | Comparative component: hindered amine compound 4 | | | | | | | | |
| | Comparative component: hindered amine compound 5 | | | | | | | | |
| UL-94VTM flame retardancy test Evaluation rating | | VTM-2 | VTM-2 | VTM-2 | VTM-2 | VTM-2 | VTM-2 | NR | NR |
| UL-94VTM flame retardancy test Ignition of cotton by falling cinders (number of times) | | 3 | 5 | 1 | 2 | 3 | 2 | 5 | 5 |

[*1] low-density polyethylene (manufactured by Japan Polypropylene Corporation: NOVATEC LF441B)
[*2] tetrakis[3-(3,5-di-tert-butyl-4-hydroxyphenyl)propionyloxymethyl]methane (manufactured by ADEKA Corporation: ADK STAB AO-60)
[*3] tris(2,4-di-tert-butylphenyl)phosphite (manufactured by ADEKA Corporation: ADK STAB 2112)
[*4] calcium stearate
[*5] glycerol monostearate

TABLE 2

|  |  | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|
| Amount | Low-density polyethylene[*1] | 72 | 72 | 72 | 71 | 71 | 71 | 71 |
|  | Phenolic antioxidant[*2] | 0.1 | 0.1 | 0.1 | 0.1 | 0.1 | 0.1 | 0.1 |
|  | Phosphorus-based antioxidant[*3] | 0.1 | 0.1 | 0.1 | 0.1 | 0.1 | 0.1 | 0.1 |
|  | Neutralizer[*4] | 0.1 | 0.1 | 0.1 | 0.1 | 0.1 | 0.1 | 0.1 |
|  | Lubricant[*5] | 0.3 | 0.3 | 0.3 | 0.3 | 0.3 | 0.3 | 0.3 |
|  | Component (A): phosphate-based flame retardant 1 (A-1):(A-2) = 30:70 | 28 |  |  |  |  |  | 28 |
|  | Component (A): phosphate-based flame retardant 2 (A-1):(A-2) = 35:65 |  | 28 |  |  |  |  |  |
|  | Component (A): phosphate-based flame retardant 3 (A-1):(A-2) = 40:60 |  |  |  | 28 | 28 | 28 |  |
|  | Component (A): phosphate-based flame retardant 4 (A-1):(A-2) = 45:55 |  |  | 28 |  |  |  |  |
|  | Component (B): hindered amine compound 1 |  |  |  |  |  |  |  |
|  | Component (B): hindered amine compound 2 |  |  |  |  |  |  |  |
|  | Comparative component: hindered amine compound 3 |  |  |  | 1 |  |  | 1 |
|  | Comparative component: hindered amine compound 4 |  |  |  |  | 1 |  |  |
|  | Comparative component: hindered amine compound 5 |  |  |  |  |  | 1 |  |
| UL-94VTM flame retardancy test Evaluation rating |  | NR | NR | NR | NR | NR | NR | NR |
| UL-94VTM flame retardancy test Ignition of cotton by falling cinders (number of times) |  | 5 | 5 | 5 | 5 | 5 | 5 | 5 |

Examples 7 to 9 and Comparative Examples 10 to 16

Resin compositions containing the flame retardant composition of the present invention (Examples 7 to 9) and resin compositions for comparison (Comparative Examples 10 to 16) were produced by blending various components in accordance with the respective formulations shown in Tables 3 and 4. For each of the thus obtained flame-retardant synthetic resin compositions, UL-94VTM test was conducted in the same manner as in Example 1 and the like. The results thereof are shown in Tables 3 and 4.

As for the phosphate-based flame retardant of the component (A), a melamine polyphosphate produced in the same manner as in Production Example 1 and a piperazine polyphosphate produced in the same manner as in Production Example 2 were used as the components (A-1) and (A-2), respectively.

TABLE 3

|  |  | Example 7 | Example 8 | Example 9 | Comparative Example 10 | Comparative Example 11 | Comparative Example 12 | Comparative Example 13 |
|---|---|---|---|---|---|---|---|---|
| Amount | Low-density polyethylene[*1] | 71 | 71 | 71 | 72 | 72 | 72 | 71 |
|  | Phenolic antioxidant[*2] | 0.1 | 0.1 | 0.1 | 0.1 | 0.1 | 0.1 | 0.1 |
|  | Phosphorus-based antioxidant[*3] | 0.1 | 0.1 | 0.1 | 0.1 | 0.1 | 0.1 | 0.1 |
|  | Neutralizer[*4] | 0.1 | 0.1 | 0.1 | 0.1 | 0.1 | 0.1 | 0.1 |
|  | Lubricant[*5] | 0.3 | 0.3 | 0.3 | 0.3 | 0.3 | 0.3 | 0.3 |
|  | Component (A): (A-1) melamine polyphosphate | 8.4 | 11.2 | 12.6 | 8.4 | 11.2 | 12.6 | 11.6 |
|  | Component (A): (A-2) piperazine polyphosphate | 19.6 | 16.8 | 15.4 | 19.6 | 16.8 | 15.4 | 17.4 |
|  | Component (B): hindered amine compound 1 | 1 | 1 |  |  |  |  |  |
|  | Component (B): hindered amine compound 2 |  |  | 1 |  |  |  |  |
|  | Comparative component: hindered amine compound 3 |  |  |  |  |  |  |  |
|  | Comparative component: hindered amine compound 4 |  |  |  |  |  |  |  |

TABLE 3-continued

|  | Example 7 | Example 8 | Example 9 | Comparative Example 10 | Comparative Example 11 | Comparative Example 12 | Comparative Example 13 |
|---|---|---|---|---|---|---|---|
| Comparative component: hindered amine compound 5 |  |  |  |  |  |  |  |
| UL-94VTM flame retardancy test Evaluation rating | VTM-2 | VTM-2 | VTM-2 | NR | NR | NR | NR |
| UL-94VTM flame retardancy test Ignition of cotton by falling cinders (number of times) | 2 | 4 | 3 | 5 | 5 | 5 | 5 |

TABLE 4

|  |  | Comparative Example 14 | Comparative Example 15 | Comparative Example 16 |
|---|---|---|---|---|
| Amount | Low-density polyethylene*1 | 71 | 71 | 71 |
|  | Phenolic antioxidant*2 | 0.1 | 0.1 | 0.1 |
|  | Phosphorus-based antioxidant*3 | 0.1 | 0.1 | 0.1 |
|  | Neutralizer*4 | 0.1 | 0.1 | 0.1 |
|  | Lubricant*5 | 0.3 | 0.3 | 0.3 |
|  | Component (A): (A-1) melamine polyphosphate | 8.4 | 11.2 | 12.6 |
|  | Component (A): (A-2) piperazine polyphosphate | 19.6 | 16.8 | 15.4 |
|  | Component (B): hindered amine compound 1 |  |  |  |
|  | Component (B): hindered amine compound 2 |  |  |  |
|  | Comparative component: hindered amine compound 3 | 1 |  |  |
|  | Comparative component: hindered amine compound 4 |  | 1 |  |
|  | Comparative component: hindered amine compound 5 |  |  | 1 |
|  | UL-94VTM flame retardancy test Evaluation rating | NR | NR | NR |
|  | UL-94VTM flame retardancy test Ignition of cotton by falling cinders (number of times) | 5 | 5 | 5 |

As shown in Tables 1 to 4, in the results of the UL-94VTM flame retardancy test, a rating of VTM-2 was obtained in Examples 1 to 9; however, an evaluation of "NR" was given in all of Comparative Examples 1 to 16.

The invention claimed is:
1. A flame retardant composition comprising components (A) and (B), wherein
(A) is a phosphate-based flame retardant, and
(B) is a hindered amine compound having a structure represented by Chemical Formula (1) in the structure:

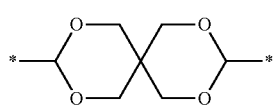

(1)

where * represents a bond, wherein optionally more than one of the structures represented by Chemical Formula (1) exist in the compound,
wherein the component (A) contains a component (A-1) and a component (A-2), wherein:
(A-1) is at least one melamine salt selected from the group consisting of melamine orthophosphate, melamine pyrophosphate, and melamine polyphosphate; and
(A-2) is at least one piperazine salt selected from the group consisting of piperazine orthophosphate, piperazine pyrophosphate, and piperazine polyphosphate, and
wherein a content ratio of the component (A) and the component (B) is in a range of 97:3 to 84:16 in terms of mass ratio.

2. The flame retardant composition according to claim 1, wherein the component (B) has a structure represented by Formula (2):

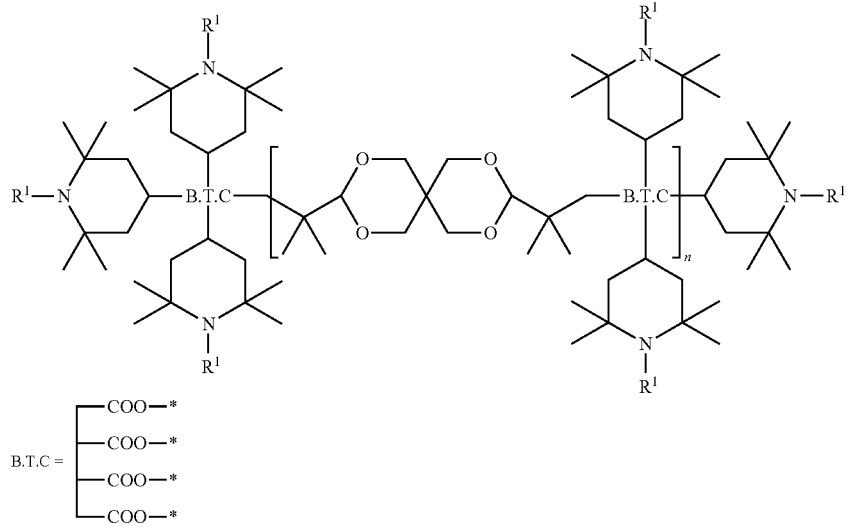

(2)

where * represents a bond; n represents an integer of 1 to 100; and $R^1$ represents a hydrogen atom, a hydroxy group, an alkyl group having 1 to 30 carbon atoms, an alkoxy group having 1 to 30 carbon atoms, a hydroxyalkyl group having 1 to 30 carbon atoms, a hydroxyalkoxy group having 1 to 30 carbon atoms, an alkenyl group having 2 to 30 carbon atoms, or an oxy radical; wherein the alkyl group, the alkoxy group, the hydroxyalkyl group, the hydroxyalkoxy group and the alkenyl group are optionally interrupted by one or plural oxygen atoms or carbonyl groups.

3. A flame-retardant synthetic resin composition, obtained by incorporating the flame retardant composition according to claim 1 into a synthetic resin.

4. The flame-retardant synthetic resin composition according to claim 3, wherein the synthetic resin is a polyolefin-based resin.

5. A molded article, obtained by molding the flame-retardant synthetic resin composition according to claim 3.

* * * * *